(12) United States Patent
Otero et al.

(10) Patent No.: US 11,495,139 B2
(45) Date of Patent: Nov. 8, 2022

(54) METHODS FOR PRODUCING PERSONALIZED LESSON RECOMMENDATIONS IN LANGUAGE LEARNING APPLICATIONS

(71) Applicant: ELSA, Corp., Los Gatos, CA (US)

(72) Inventors: Paula López Otero, Coruna (ES); Xavier Anguera Miro, Lisbon (PT)

(73) Assignee: ELSA, Corp., Los Gatos, CA (US)

( * ) Notice: Subject to any disclaimer, the term of this patent is extended or adjusted under 35 U.S.C. 154(b) by 0 days.

(21) Appl. No.: 17/119,876

(22) Filed: Dec. 11, 2020

(65) Prior Publication Data

US 2022/0189337 A1 Jun. 16, 2022

(51) Int. Cl.
*G09B 19/06* (2006.01)
*G09B 5/00* (2006.01)

(52) U.S. Cl.
CPC ............. *G09B 19/06* (2013.01); *G09B 5/00* (2013.01)

(58) Field of Classification Search
CPC . G09B 19/06; G09B 7/00; G09B 7/02; G09B 5/00; G09B 5/08
See application file for complete search history.

(56) References Cited

U.S. PATENT DOCUMENTS

| 2009/0111085 | A1* | 4/2009 | Rudy | ..................... G09B 7/00 434/353 |
| 2017/0309202 | A1* | 10/2017 | Chen | ..................... G09B 7/00 |
| 2019/0385480 | A1* | 12/2019 | Suzuki | ..................... G10L 25/30 |

OTHER PUBLICATIONS

Abdi, S. et al., "A Multivariate Elo-based Learner Model for Adaptive Educational Systems," CoRR vol. 1910-12581, Proceedings of the 12th International Conference on Education Data Mining (2019) 6 pages.
Liu, L. et al., "SARLR: Self-adaptive Recommendation of Learning Resources," ITS 2018 Workshop Proceedings: Montreal, QC, Canada (Jun. 11-15, 2018) pp. 151-158.
Pelanek, R., "Applications of the Elo Rating System in Adaptive Educational Systems," Computers and Education (2016) 16 pages.
Prisco, A. et al., "A multidimensional ELO model for matching learning objects," IEEE Frontiers in Education Conference (FIE), San Jose, CA (2018) pp. 1-9.

* cited by examiner

*Primary Examiner* — Robert J Utama
(74) *Attorney, Agent, or Firm* — Goodwin Procter LLP

(57) ABSTRACT

A method for creating personalized lesson recommendations for a user is provided. In some embodiments, the method includes assigning a skill profile to the user, where the skill profile includes a skill vector associated with one or more fine-grained skills of the user. The method also includes assigning a difficulty profile to a task to be practiced by the user, where the difficulty profile includes a task difficulty vector associated with one or more fine-grained skills of the task. Further, the method include prioritizing the task within a list of recommended tasks offered to the user based on a comparison between the skill profile of the user and the difficulty profile of the task.

21 Claims, 5 Drawing Sheets

METHODS FOR PRODUCING PERSONALIZED LESSON RECOMMENDATIONS IN LANGUAGE LEARNING APPLICATIONS

FIELD OF THE DISCLOSURE

This disclosure relates to methods that, in the context of a language learning application, allow a language learning application to provide personalized recommendations about lessons a user can practice according to the user's specific learning needs.

BACKGROUND

In language learning applications, a user is often offered lesson recommendations based on behavior-based and/or skill-based approaches. In behavior-based approaches, the recommendations are obtained by tracking the behavior of the user in the language learning application and comparing it to similar users that express similar behavior—for example, by computing user similarity and behavior similarity. Once the user is placed within a certain similarity group, content that is appealing to the group is expected to also appeal to the user. In skill-based approaches, the recommendations are driven by matching the estimated skill of the user with an "estimated" difficulty of the lessons.

SUMMARY

However, the behavior-based and/or skill-based approaches may not achieve an optimal lesson recommendation for all the users. This is because behavior-based and/or skill-based approaches are based on generic metrics (e.g., "the wisdom of the crowd") that may not apply to every user. In other words, these approaches may fail to account for individual user characteristics that are not part of a similarity group. As a result, the user is offered lesson recommendations which are inappropriate for his/her skill level. For example, the offered lessons can be too difficult or too easy for the user.

According to an aspect of the present disclosure, a language learning application (application) performs a method for offering to a user personalized lesson recommendations according to the user's specific learning needs. In some embodiments, the application produces a difficulty profile for each lesson. The difficulty profile is then compared to a user's current skill level to appropriately select, and prioritize, lessons for the user to practice. In some embodiments, this is accomplished by first assigning to the user a "standard" skill profile based on the user's native language and a self-declared proficiency level (also referred to herein as "self-declared nativeness level"). In some embodiments, the standard pronunciation skill profile is assigned to the user when he/she uses the application for the first time—for example, during a registration phase. In some embodiments, the standard pronunciation skill profile is computed as an aggregate of all users registered with the application who share similar linguistic characteristics with the user. In some embodiments, as the user keeps practicing the lessons from the application, his/her skill profile is constantly adapting to reflect the user's current skill level.

Further, each lesson in the application is assigned an initial difficulty profile, which is dynamically adapted as users practice lessons. Additional lessons are recommended to the user by determining which lessons are most appropriate for the user based on a comparison between the user's current skill profile and the lessons' difficulty profiles. Based on this comparison, the application can modify the list of recommended lessons to encourage diversity (e.g., recommend different lesson types), define when the user needs to retake a lesson to practice, group the lessons by topic or common skill, apply constraints on which lesson types to show and when, provide seasonal recommendations, and ensure that lessons the user has already practiced are not recommended again immediately.

According to another aspect of the present disclosure, a method for creating personalized lesson recommendations for a user includes assigning a skill profile to the user, where the skill profile includes a skill vector associated with one or more fine-grained skills of the user. The method also includes assigning a difficulty profile to a task to be practiced by the user, where the difficulty profile includes a task difficulty vector associated with one or more fine-grained skills of the task. Further, the method include prioritizing the task within a list of recommended tasks offered to the user based on a comparison between the skill profile of the user and the difficulty profile of the task.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION OF THE DISCLOSURE

Figure 1:
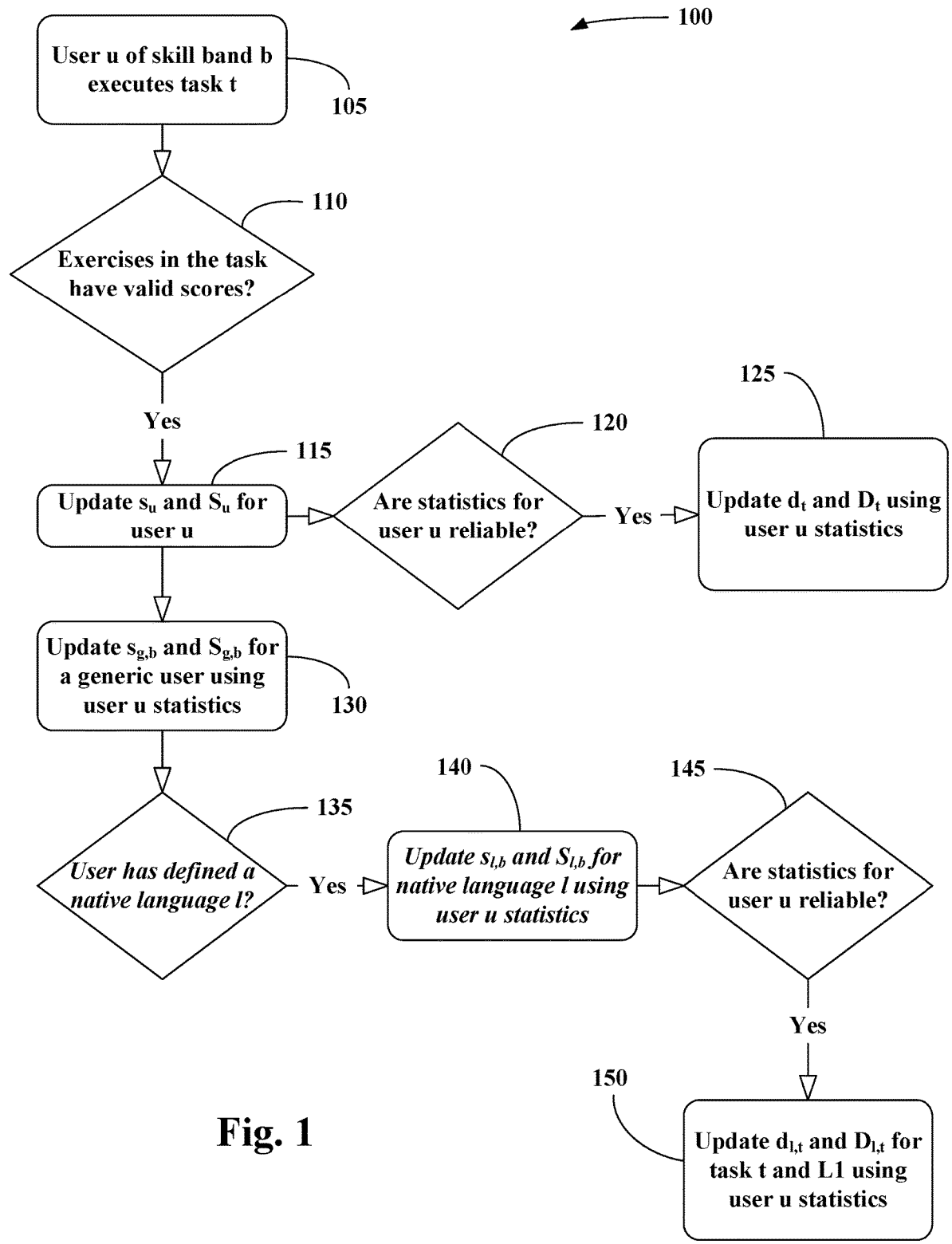
FIG. 1 is a flowchart a method for updating user and lesson profiles after a user practices a lesson, according to some embodiments.

As described above, the method disclosed herein may include the following high-level operations: i) assigning and updating a skill profile for each user based on the user's performance when practicing one or more lessons, ii) assigning and updating a difficulty profile for each lesson based on the performance of one or more users when practicing the lesson, iii) comparing the updated difficulty profiles of one or more lessons with the updated skill profile of the user, and iv) based on the comparison between the updated profiles, creating a list of lesson recommendations for the user. In some embodiments, applications can use this method to provide lesson recommendations that benefit the user in areas where the user's skills are deficient.

Assigning an Initial Standard Skill Profile to a User

When the user uses the language learning application (application) for the first time, he/she may be assigned a "standard" skill profile that serves as a "starting point" for the user's skill profile. The standard skill profile then may be dynamically updated based on the user's performance after each lesson so that the skill profile reflects the true skill level of the user in subsequent lessons. In some embodiments, the standard skill profile is assigned, for example, when the user registers with the application. By way of example and not limitation, the standard skill profile can be based on information provided by the user. For example, the user can be asked to provide his/her native language l and a self-declared proficiency level of the language of interest—e.g., basic, mid-level, advanced.

Initially, when there are no historical pronunciation skill data available for the user (e.g., the user is new to the application), the user may be assigned a standard skill profile as discussed above. In some embodiments, the standard skill profile represents a group of users who share the same native language l and the same self-declared proficiency level with the user. According to some embodiments, historical data from users using the application and having the same native language l with the user can be used to generate a table for native language l with two or more skill bands b, where each skill band b corresponds to a self-declared proficiency level bracket (bracket). The number of skill bands b in the table may be defined by the number of brackets available for native language l. In some embodiments, similar tables can be generated for all the available native languages l in the application. Therefore, when the user is assigned a standard skill profile, the user effectively may be matched to a skill band b from a table created for his/her native language l, where the skill band b corresponds to a self-declared proficiency bracket mapped to the self-declared proficiency level of the user.

In some embodiments, the number of bands b in the table is greater than 1—e.g., 2, 3, 4, 5, 8, 10, etc. Further, each band b can be assigned a value, which can be used in subsequent calculations discussed below. By way of example and not limitation, Table 1 shows exemplary bands (e.g., five bands) generated for a native language l.

It is understood that additional tables, similar to Table 1, with fewer or additional bands b may be generated for all the native languages l in the application. For example, a table, like Table 1, can be generated for German, English, Greek, Spanish, French, Italian, Chinese, Japanese, and any other language available in the application. Each of these tables can have the same or different number of bands.

TABLE 1

Self-declared proficiency level bracket

| Band | Minimum | Maximum | Assigned Value |
|---|---|---|---|
| 1 | 0 | 50.5 | 45 |
| 2 | 50.5 | 61.5 | 56 |
| 3 | 61.5 | 72.5 | 67 |
| 4 | 72.5 | 84 | 78 |
| 5 | 84 | 100 | 90 |

In some embodiments, when there are not enough historical data on a specific native language l or when the user does not provide his/her native language information during registration, a "generic" skill profile is assigned to the user in place of the standard profile. According to some embodiments, the generic skill profile assigned to the user is derived from a group of users who share the same proficiency level with the user across every native language l available in the application.

In some embodiments, the "overall" skill level of a user u ($s_u$) is updated when user u performs a task t (e.g., practices a lesson dedicated to one or more skills). More specifically, the user's skill level $s_u$ is updated based on a scoring system that provides scoring results for each practiced task t. In addition, user u is assigned a "skill" vector $S_u$, which includes fine-grained skills $S_{u,i}$ for all the different user skills i.

In some embodiments, the method accounts for the following user skills i: i) pronunciation skills, ii) word stress skills, iii) intonation skills, iv) fluency and timing skills, and v) listening ability skills. The above list of user skills is not exhaustive and additional skills are possible and within the spirit and the scope of this disclosure. In some embodiments, each skill i includes any number of fine-grained skills or elements $n_s$ captured by vector $S_u$.

For example, the pronunciation skills may include the following fine-grained skills or elements: i) pronunciation of individual phonemes that are position dependent in a word—e.g., in the beginning, middle, or end of the word; ii) pronunciation of phoneme clusters (groups of phonemes) also position dependent; iii) pronunciation of homographs that differ in the pronunciation (e.g., the word "live"); iv) appropriately performing linkage between two words when required; v) appropriately dropping phonemes when required; and vi) appropriately pronouncing flap sounds (e.g., flap instead of /t/ or /d/ sound) and identifying when the flap sounds are appropriate (e.g., do not use a flap sound in the beginning of a word or do not use a flap sound in certain exceptions).

The intonation skills may include the following fine-grained skills or elements: i) applying correct prominence to words in a sentence compared to a reference; ii) providing appropriate variability of intonation when producing a sentence; and iii) applying appropriate overall intonation curve—e.g. interrogative, affirmative, etc.

The fluency and timing skills may include the following fine-grained skills: i) appropriate use of rhythm; ii) appropriate use of pausing; and iii) appropriate use of syllable and phoneme duration.

Finally the listening ability skills can include the following fine-grained skills or elements: i) appropriate perception of minimal pairs—e.g., pairs of phonemes that are very similar and when appearing in a word they change the meaning of the word; and ii) capacity to identify the existence of common pronunciation errors.

It is noted that the above of fine-grained skills or elements corresponding to each skill i are not exhaustive and additional fine-grained skills or elements can be included. These additional fine-grained skills or elements are within the spirit and the scope of this disclosure.

In some embodiments, the Elo algorithm can be used to estimate and track the progress of the user's skill level $s_u$ and skill vector $S_u$. In a similar fashion, an overall difficulty $d_t$ level can be assigned and tracked for each practiced task t by a user. Further, a difficulty vector $D_t$, which is associated with each fine-grained skill practiced in task t by a user, can be assigned and tracked.

Obtaining Information for a User u Performing a Task t

In some embodiments, a task t consists of exercises (e.g., sub-tasks or micro-tasks), which targets one or more user skills and/or their respective one or more fine-grained skills. As the user practices, an overall result $R_{tu,i}$ and score $score_{tu,i}$ may be calculated for each skill i and the skill's respective fine-grained skills. In some embodiments, score $score_{tu,i}$ is calculated from overall result $R_{tu,i}$ and element i of a vector $C_u$, where element i of vector $C_u$ represents the number of times the fine-grained skills of skill i have been updated in the user's vector $S_u$. Initially, element i of a vector $C_u$ may be zero for skill i, however element i of vector $C_u$ may be updated as user u continues to practice. Other pertinent parameters include the number of times the entry for user u has been updated, represented by $c_u$.

Subsequently, the skill vector $S_u$ for user u can be obtained. As discussed above, the skill vector $S_u$ for user u is a vector with $n_s$ elements (e.g., includes fine-grained skills $S_{u,i}$ for all the different user skills i). If user u has previously defined a native language l and a self-declared proficiency level, then user u can be assigned to a skill band b according to a table similar to Table 1. Therefore, skill vector $S_u$ may initialize with a vector $S_{l,b}$, where l is the native language of the user u and b is the skill band according to a table similar to Table 1. In the event that user u does not have defined a native language l, then skill vector $S_u$ may initialize with a vector $S_{g,b}$, which represents a generic vector having a skill band b.

When user u having a skill vector $S_u$ performs a task t having difficulty vector $D_t$, a probability $P_{tu,i}$ may be computed, where probability $P_{tu,i}$ designates whether user u correctly performs task t. According to some embodiments, probability $P_{tu,i}$ can be a function of the difference between the skill vector $S_u$ for user u and the difficulty vector $D_t$ for task t.

In some embodiments, the initial skill vector $S_u$ as defined above and the difference between score $score_{tu,i}$ and probability $P_{tu,i}$ are used to update skill vector $S_u$ of user u. Each time user u performs a new task t, his/her skill vector $S_u$ may be updated based on the previous skill vector $S_u$ value and the difference between the score $score_{tu,i}$ corresponding to the new task t and the probability $P_{tu,i}$ that user u correctly performs the new task t.

Obtaining Information for a Task

According to some embodiments, the difficulty of each task in the application is computed following a similar data-driven approach (e.g., based on the Elo algorithm). In some embodiments, an updated overall difficulty level $d_t$ is assigned for each task t based on computed values of the overall result $R_{tu,i}$ and the difference between the probability $P_{tu,i}$ and score $score_{tu,i}$ when task t is practiced by a user (e.g., user u). In some embodiments, an uncertainty function and the number of times the entry for task t has been updated $c_t$ may also be used in the calculation of the overall difficulty level $d_t$ of task t. It is noted that the difficulty level $d_t$ may be independent of which user performs the task. This means that whenever a user performs a given task, the difficulty level of that task may be updated. Task t also may be assigned a vector $C_t$ which reflects the number of times the difficulty vector $D_t$ of task t has been updated.

In some embodiments, each task t has an associated weight $w_t$ that indicates how reliable the difficulty level $d_t$ estimate is. In some embodiments, $w_t$, which depends on $c_t$, is updated every time task t is updated. Further, each task t also has an associated target vector $f_t$ comprising elements $f_t(i)$ that represents the practice frequency of a fine-grained skill in task t in the form of a percentage. For example, for 3 fine-grained skills (0, 1, 2) in a given task t, where each fine-grained skill appears in the task 3, 1 and 0 times, respectively, the target vector $f_t$ may be defined as f=[0.75, 0.25, 0] so that the total sum of the vector is equal to 1. According to some embodiments, vector $f_t$ intuitively provides a way to classify how useful the task is based on the desired fine-grained skills. The target vector can be customized dynamically to modify the fine-grained skills that will be considered for training.

In some embodiments, the difficulty vector $D_t$ is subsequently updated based on the previous value of the difficulty vector $D_t$ and the difference between the probability $P_{tu,i}$ and the score $score_{tu,i}$ calculated for user u when he/she practiced task t.

In some embodiments, after having the application collecting statistics for some time (e.g., estimating user skills and task difficulties), a data-driven approach is used to estimate the initial difficulty of each item (e.g., a task, a lesson, a micro-task, etc.). The goal of this operation is to initialize difficulty values of items to enable item recommendations as soon as the items are available to be practiced by the user, without having to wait for sufficient statistical data to be collected. In some embodiments, this operation is referred to as "task difficulty initialization".

Example: User and Lesson Profile Updates after a User Practices a Lesson

FIG. 1 is a flowchart of method 100 that describes the profile update process for users and lessons respectively after a user practices a lesson. Method 100 may begin with operation 105 where user u, who is assigned to a skill band b according to his/her native language l, executes a task t. In referring to operation 110, an overall result $R_{tu}$ is obtained for task t. If the exercises in task t have valid scores (e.g., overall scores and fine-grained skill scores are available for task t) the user's profile level $s_u$ and skill vector $S_u$ can be updated in operation 115. In referring to operation 120, if the user vector $S_u$ has been updated a sufficient number of times (e.g., at least 10, 20, 25, 50, 100, etc.) so that it is reliable enough to be use in the overall difficulty level and difficulty vector update of task t, then the user vector $S_u$ can be used in operation 125 to update overall difficulty level $d_t$ and difficulty vector $D_t$ of task t.

Additionally, the statistical data from the user can be used to update the generic vector $S_{g,b}$ and generic profile level $S_{g,b}$ in operation 130. In referring to operation 135, if the user has defined a native language l, the profile vector $S_{l,b}$ and the overall profile level $S_{l,b}$ for a user, who has a native language l and is assigned to a band b, can be updated based on the user's data. In referring to operation 145, if the statistical data obtained from the user is reliable, the overall difficulty level $d_{l,t}$ for task t (corresponding to native language l) and the difficulty vector $D_{l,t}$ for each fine-grained skill (corresponding to native language l) can be updated using the statistical information obtained for user u.

Recommending Lessons to a User

According to some embodiments, the goal of the lesson recommendations is to ensure that i) the recommendation covers those fine-grained skills for which the user needs additional practice; ii) the difficulty of the recommended lesson(s) is above the user's fine-grained skill level to challenge the user, but not substantially above the user's fine-grained skill level; iii) the difficulty of the recommended lesson(s) is reasonably close to the overall skill of the user.

To achieve the aforementioned goals, a user u may be assigned a vector Wu that is a measure of the user's pronunciation deficiencies. For example, larger values for vector $W_u$ may indicate that the user likely would benefit from practicing a particular sound or skill. Additionally, a vector $F_{tu}$ may be introduced to measure the difference between the difficulty level of a task t (represented by difficulty vector $D_t$) and the user's fine-grained skill status (represented by the user's skill vector $S_u$). Further, a vector $P_{tu}$ may be assigned to provide a higher weight to lessons that are more difficult than the user's skill level without ignoring the lessons that are easier than the user's skill level.

In addition to the above, a penalty penalty($s_u$, $d_t$) may be computed for every task t. The penalty may be computed based on the overall difficulty value $d_t$ of task t and the user's profile level $s_u$. For example, if the absolute difference between $d_t$ and $s_u$ is greater than 50, the penalty may be 0.5; if the absolute difference between $d_t$ and $s_u$ is equal to or less than 10, the penalty may be 1 (no penalty); if the absolute difference between $d_t$ and $s_u$ is greater than 10 and less than 50, the penalty may have a value between 0.5 and 1.

In some embodiments, the recommendation score for a lesson is a function of one or more of the aforementioned quantities (e.g., penalty($s_u$, $d_t$), vector $P_{tu}$, target vector $f_t$ for task t, vector $W_u$, and/or weight $w_t$ for task t). In some embodiments, the recommendation score for a task is obtained for the entire number $n_s$ of available fine-grained skills.

Example: Selection of User Statistics to Compute Lesson Recommendations

Figure 2:
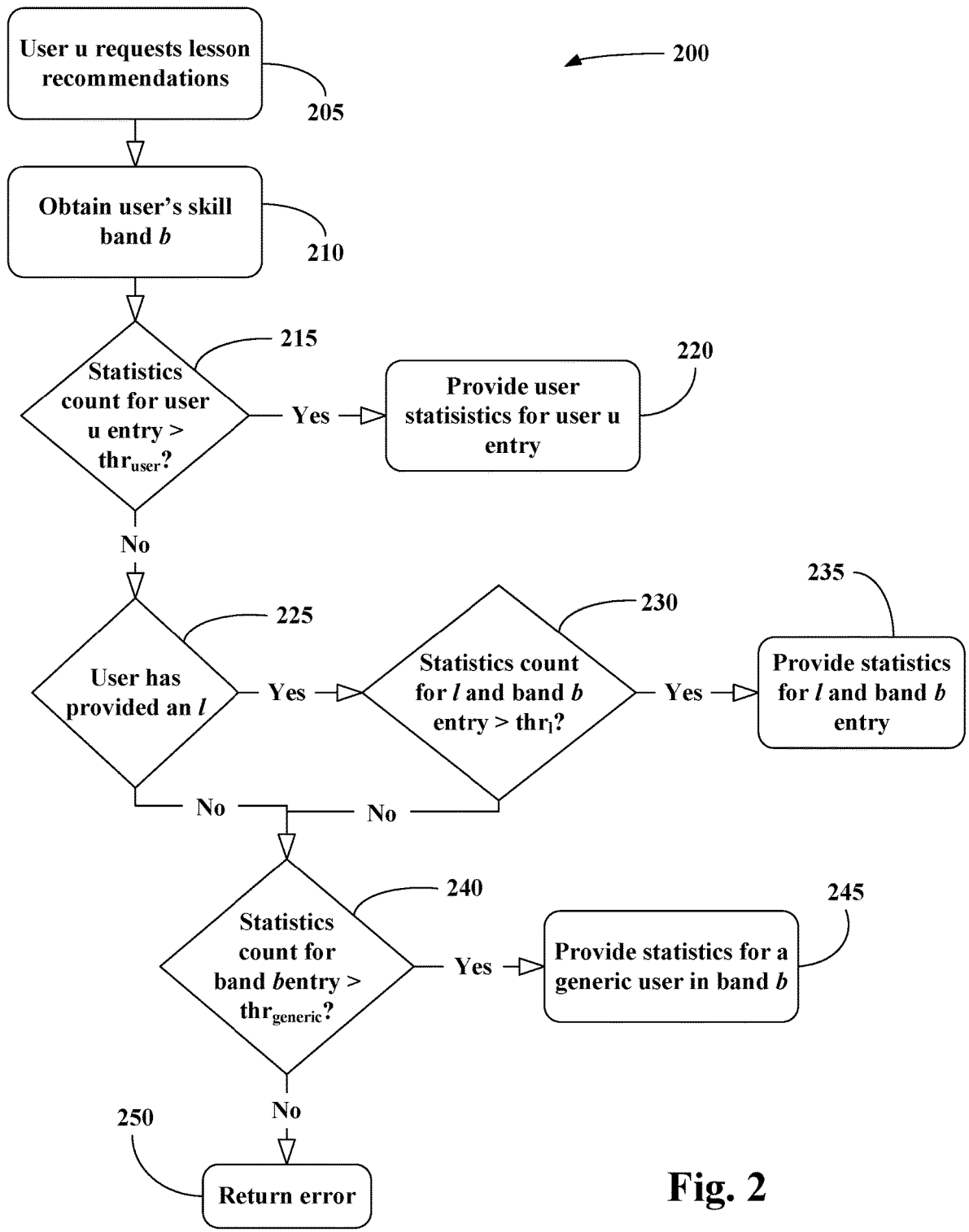
FIG. 2 is a flowchart of a method for using selective user statistics to compute lesson recommendations, according to some embodiments.

FIG. 2 is a flowchart of method 200 that describes the selection of user statistics to compute lesson recommendations, according to some embodiments. Method 200 begins with operation 205 where the applications receives a request for lesson recommendations from user u. For example, the user, through the application, requests lesson recommendations. In response to the user's request, the application, in operation 210, may obtain the user's skill band b and overall skill level $s_u$. In referring to operation 215, the statistic count for a user entry $c_u$ may be compared to a threshold $thr_{user}$ for the user. If $c_u$ is above $thr_{user}$, the user statistics (e.g., overall skill level $s_u$ and skill vector $S_u$) may be provided according to operation 220. If $c_u$ is below the threshold, the application may check if the user has provided his/her native language l according to operation 225. Subsequently, the application may check, according to operation 230, if the statistics count $c_{l,b}$ related to the user's native language l and band b is above a threshold $thr_l$ (a threshold used for native language l). If the statistics count $c_{l,b}$ is above a threshold $thr_l$, the user statistics for native language l and band b (e.g., overall skill level $S_{l,b}$ and skill vector $S_{l,b}$) may be provided according to operation 235.

If the user has not provided his/her native language l according to operation 225 or the statistics count $c_{l,b}$ is below threshold $thr_l$, the application may check if the generic count $c_{g,b}$ for a user in band b is above a threshold $thr_{generic}$ for generic entries according to operation 240. If $c_{g,b}$ is above threshold $thr_{generic}$, the application may provide generic user statistics for band b (e.g., a generic overall skill $s_{g,b}$ and skill profile $S_{g,b}$) according to operation 245. If $c_{g,b}$ is below threshold $thr_{generic}$, no recommendation may be made due to the limited availability of user information.

Post Processing

After computing a sorted sequence of scores for all the lessons (e.g., tasks), a post processing may be applied to re-order the list of recommended lesson based on the following incentives: i) avoid recommending a lesson to the same user in a short period of time after its last execution by the user, and/or ii) improve the user's experience by recommending lessons that are similar in skill and topic.

In some embodiments, item (i) is achieved by creating and actively updating (e.g., in real time) a list of lessons for recommendation where the recommended lessons are placed on the top of the list, followed by the lessons not yet mastered by the user, followed by the lessons mastered by the user. In some embodiments, lessons that have not been previously recommended or practiced are prioritized. The lesson list may be updated every time the user practices new lessons so that appropriate lessons will eventually reach the top of the list and be recommended for the first time or again to the user. In some embodiments, lessons that are recommended, but not practiced, will reach the top of the list faster than those that were practiced. Further, lessons that were not mastered may be recommended again.

Regarding item (ii), the skill can be selected by the user or by an algorithm. Further, the skill can be selected so that it is not recommended too often. This can be achieved with a similar method used in item (i) for the recommended lessons or with a spaced repetition algorithm. Finally, when the user has achieved a good overall pronunciation (e.g., when he/she masters all the skills), the recommendations can shift from skills to topics.

Figures 3, 4:
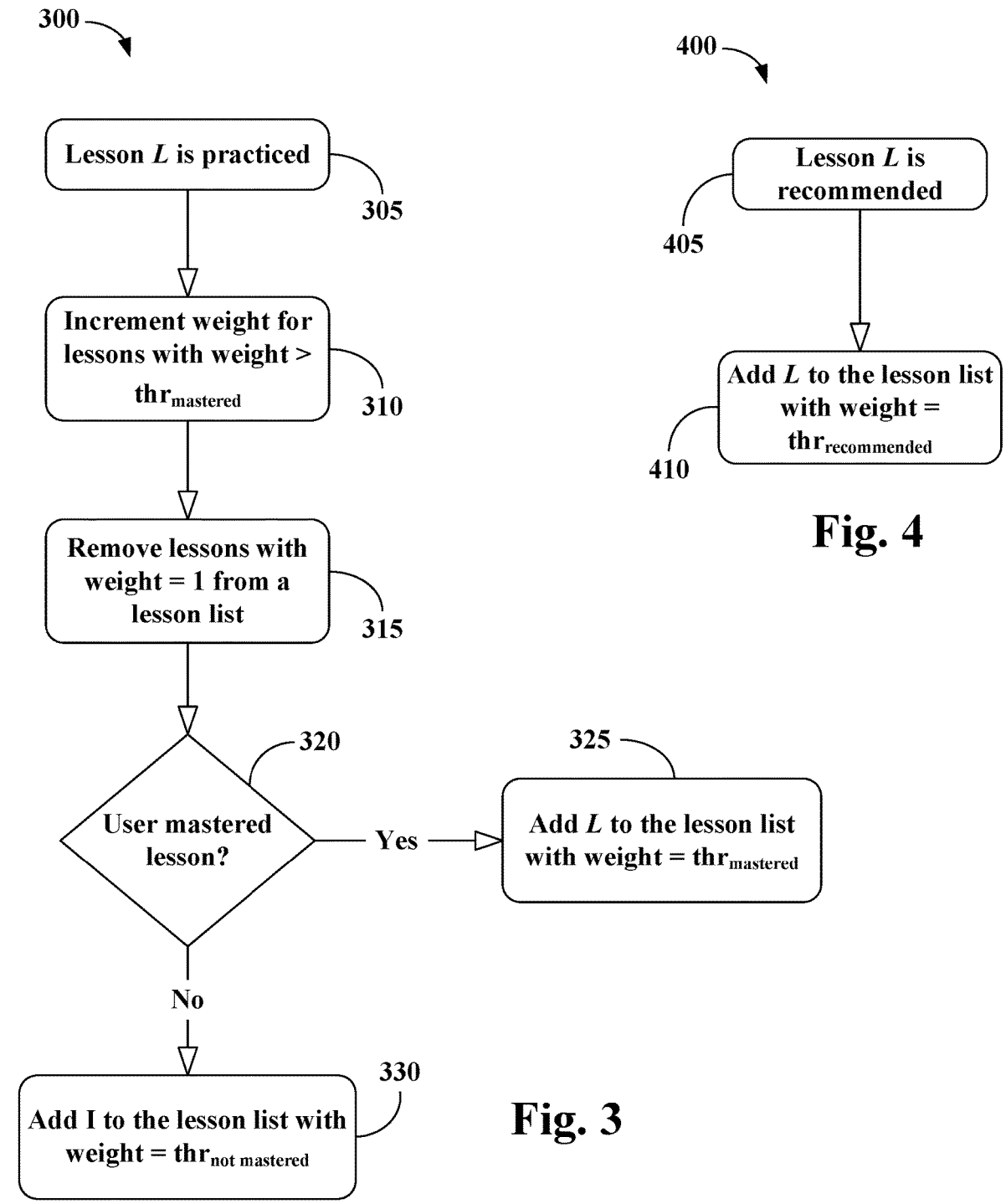
FIG. 3 is a flowchart of a method for updating a lesson "weight list" after a lesson practice, according to some embodiments.
FIG. 4 is a flowchart of a method for updating a lesson "weight list" after a lesson recommendation, according to some embodiments.

Examples of Updating a Weights List for Lessons after a Lesson Practice or a Lesson Recommendation According to some embodiments, FIG. 3 is a flow chart of a method 300 for updating a weights list for lessons after a lesson practice by a user. According to some embodiments, method 300 is performed as part of the post processing operation described above. According to some embodiments, method 300 begins with operation 305 where a user practices lesson L. Subsequently, in operation 310, the weights for all the lessons in the list with a weight greater than $thr_{mastered}$ may be incremented. For example, $thr_{mastered}$ can be equal to 0.0000001. In operation 315, lessons with weight equal to 1 may be removed from the list. This is done to save space and because 1 is the maximum weight—equivalent to not applying a penalty to the lesson. In referring to operation 320, if the user performed the task correctly, lesson L may be added to the list and its weight may be set equal to $thr_{mastered}$ (e.g., 0.0000001) according to operation 325. If lesson L is already in the list, its pre-existing weight may be replaced (e.g., set to $thr_{mastered}$). In referring to operation 320, if the user does not performed the task correctly, lesson L may be added to the list and its weight becomes equal to $thr_{not\_mastered}$ according to operation 325. For example, $thr_{not\_mastered}$ can be equal to 0.001 (e.g., greater than $thr_{mastered}$). If lesson L is already in the list, its weight may be replaced (e.g., set to $thr_{not\_mastered}$).

According to some embodiments, FIG. 4 is a flow chart of a method 400 for updating a weights list after a lesson recommendation. According to some embodiments, method 400 is performed as part of the post processing operation described above. According to some embodiments, method 400 begins with operation 405 where a user is recommended by the application to practice lesson L. Subsequently, lesson L may be added to the list, if it is not there, and assigned a weight equal to $thr_{recommended}$. For example, $thr_{recommended}$ can be equal to 0.5. If lesson L is already in the list, its weight may be replaced (e.g., set to $thr_{recommended}$).

Example of a Method for Presenting Lesson Recommendations to a User

Figure 5:
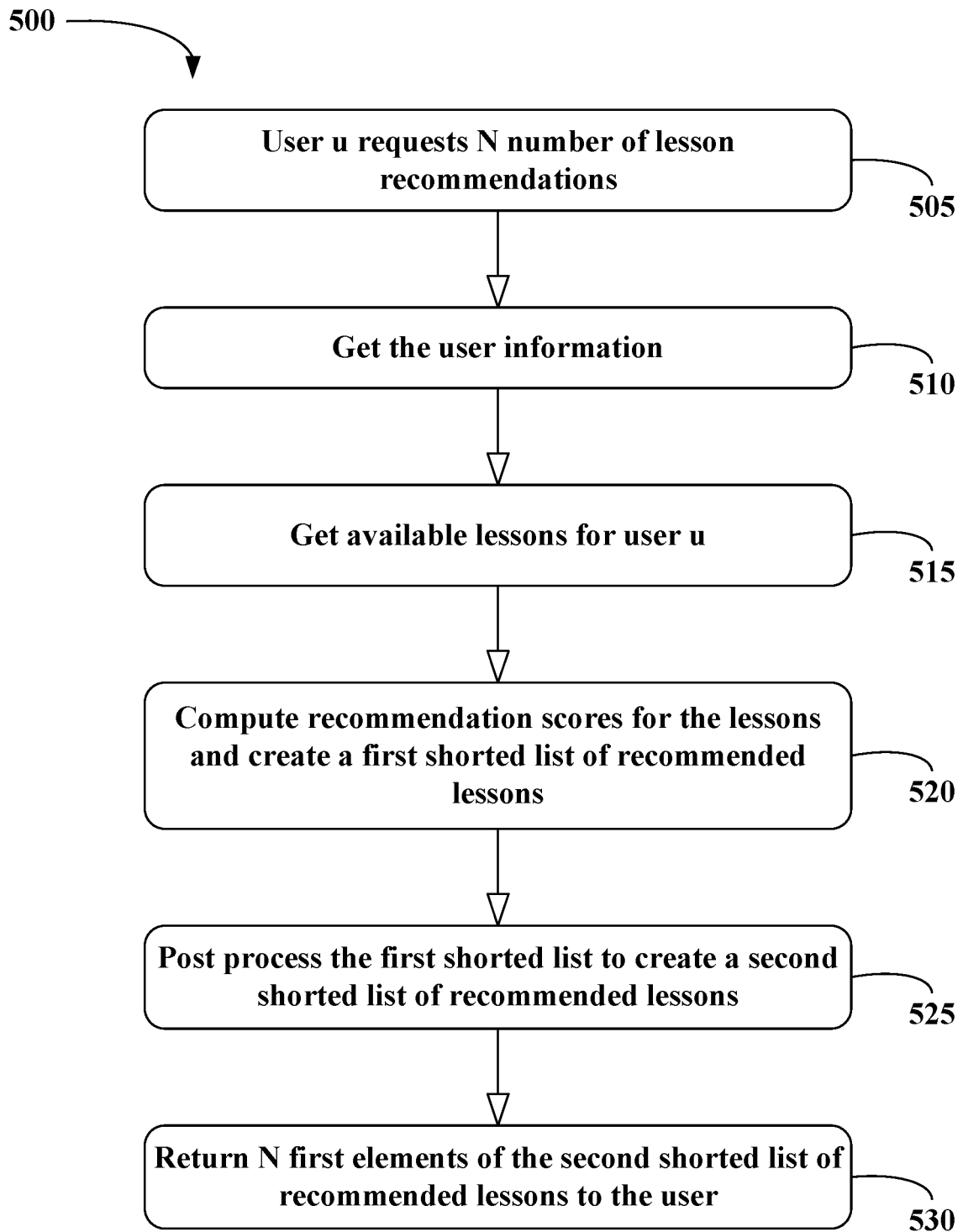
FIG. 5 is a flowchart of a method for presenting lesson recommendations to a user, according to some embodiments.

According to some embodiments, FIG. 5 is a flowchart of a method 500 for presenting lesson recommendations to a user. By way of example and not limitation, method 500 may be executed by a software application (application) that collects data from a variety of sources (e.g., online databases and servers) and is capable of performing the computational tasks described above with respect to the user, tasks, and lessons.

In some embodiments, method 500 begins with operation 505 where a user u requests N number of lesson recommendations. In subsequent operation 510, the user profile information may be collected. The user profile information—which can include the user's skill band b, native language l, updated skill vector $S_u$, overall skill level $s_u$, etc. —may be stored, for example, in a user database accessible by the application. In operation 515, a list of all the available lessons for user u may be obtained. The list of available lessons may be stored, for example, in a user's database accessible by the application. In operation 520, the recommendation scores for the lessons may be calculated and a first shortened list of recommended lessons may be prepared. In operation 525, a post-processing operation may be applied to the first shortened list to create a second shortened list of recommended lessons as described above. Once the second shortened list of recommended lessons is prepared, N first elements from the second shortened list of recommended lessons may be presented to the user according to operation 530.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
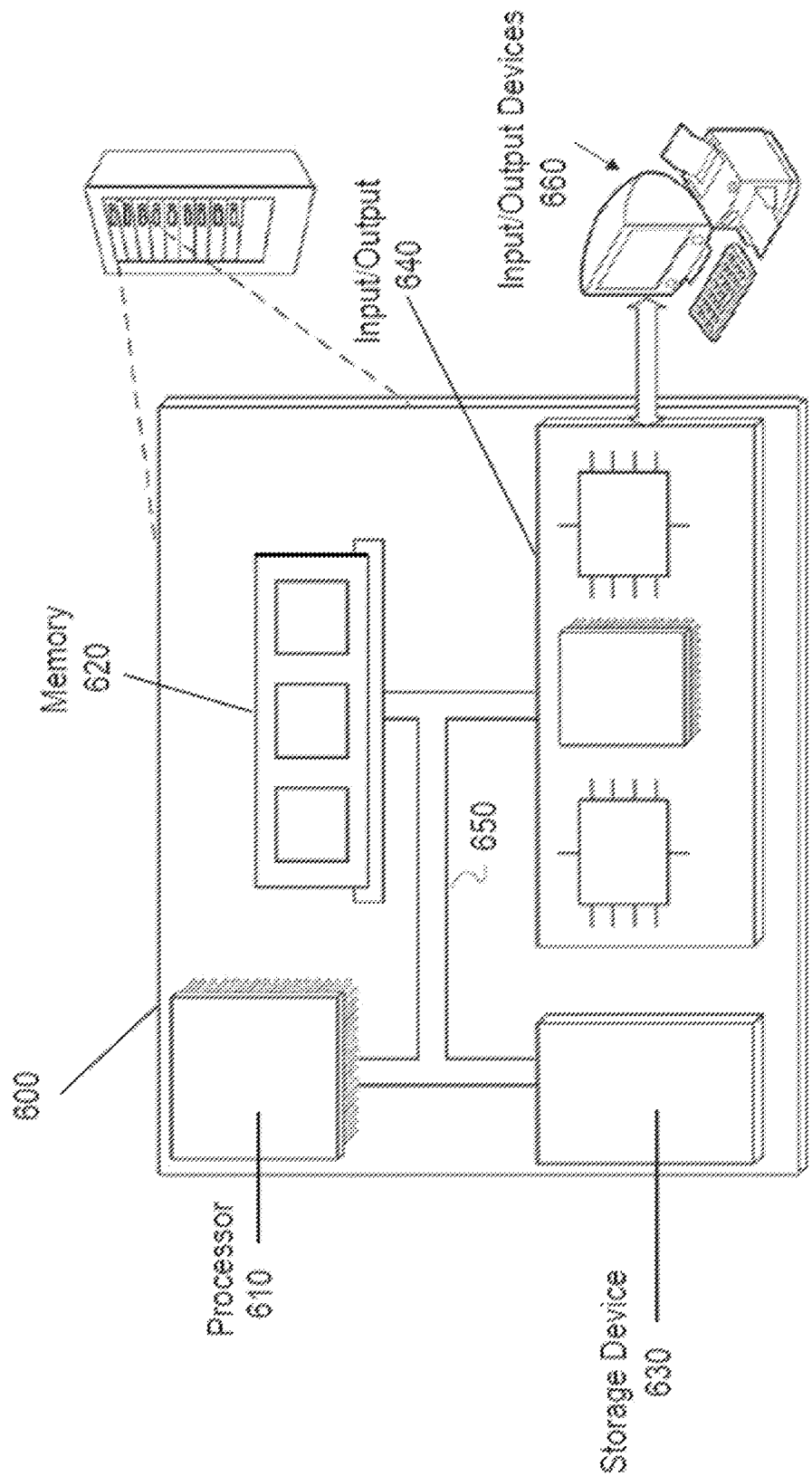
FIG. 6 is a diagram of an example of a computer system capable of executing the methods described herein.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card or a wireless modem (e.g., a 3G, 4G, or 5G wireless modem). In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phrasing and terminology used herein are for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for creating personalized language lesson recommendations for a user of a language learning application, the method comprising:
   performing, by one or more processing devices:
   receiving from the user, via a user interface of the language learning application, native language information and self-declared language proficiency level information, wherein the native language information indicates a native language of the user, and wherein the self-declared language proficiency level information indicates a proficiency level of the user for a second language;
   assigning a language skill profile to the user based on the received native language information and self-declared language proficiency level information, wherein the language skill profile comprises a skill vector associated with one or more high-level language-related user skills of the user related to at least one of pronunciation skills, word stress skills, intonation skills, fluency and timing skills, and listening ability skills, wherein each high-level language-related user skill comprises one or more fine-grained language-related user skills, and wherein the language learning application matches the user to a plurality of other users who share the native language of the user and the proficiency level of the user for the second language based on the assigned language skill profile of the user;
   assigning a difficulty profile to a language learning task to be practiced by the user, wherein the difficulty profile is based on results of one or more of the plurality of other users practicing the language learning task, and wherein the language learning task comprises one or more language learning exercises related to the second language; and
   prioritizing the language learning task within a list of recommended language learning tasks offered to the user based on a comparison between the language skill profile of the user and the difficulty profile of the language learning task.

2. The method of claim 1, wherein the skill vector indicates a respective skill level of the user for each of the one or more high-level language-related user skills, and wherein the difficulty profile comprises a task difficulty vector indicating a respective difficulty level of the language learning task for each of the one or more high-level language-related user skills.

3. The method of claim 1, wherein the language skill profile further comprises an overall skill level for the user.

4. The method of claim 1, wherein the difficulty profile further comprises an overall difficulty level for the task.

5. The method of claim 1, wherein the one or more fine-grained language-related user skills are selected from a group comprising pronunciation of individual phonemes, pronunciation of phoneme clusters, pronunciation of homographs, flap sounds and word linkage.

6. The method of claim 1, wherein the one or more-fine grained language-related user skills comprise prominence of words and intonation.

7. The method of claim 1, wherein the one or more-fine grained language-related user skills comprise rhythm, pausing during speech, syllable and phoneme duration.

8. A system, comprising:
one or more computers and one or more storage devices storing instructions that are operable, when executed by the one or more computers, to cause the one or more computers to perform operations for creating personalized language lesson recommendations for a user of a language learning application, the operations comprising:
receiving from the user, via a user interface of the language learning application, native language information and self-declared language proficiency level information, wherein the native language information indicates a native language of the user, and wherein the self-declared language proficiency level information indicates a proficiency level of the user for a second language;
assigning a language skill profile to the user based on the received native language information and self-declared language proficiency level information, wherein the language skill profile comprises a skill vector associated with one or more high-level language-related user skills of the user related to at least one of pronunciation skills, word stress skills, intonation skills, fluency and timing skills, and listening ability skills, wherein each high-level language-related user skill comprises one or more fine-grained language-related user skills, and wherein the language learning application matches the user to a plurality of other users who share the native language of the user and the proficiency level of the user for the second language based on the assigned language skill profile of the user;
assigning a difficulty profile to a language learning task to be practiced by the user, wherein the difficulty profile is based on results of one or more of the plurality of other users practicing the language learning task, and wherein the language learning task comprises one or more language learning exercises related to the second language; and
prioritizing the language learning task within a list of recommended language learning tasks offered to the user based on a comparison between the language skill profile of the user and the difficulty profile of the language learning task.

9. The system of claim 8, wherein the skill vector indicates a respective skill level of the user for each of the one or more high-level language-related user skills, and wherein the difficulty profile comprises a task difficulty vector indicating a respective difficulty level of the language learning task for each of the one or more high-level language-related user skills.

10. The system of claim 8, wherein the language skill profile further comprises an overall skill level for the user.

11. The system of claim 8, wherein the difficulty profile further comprises an overall difficulty level for the task.

12. The system of claim 8, wherein the one or more-fine grained language-related user skills are selected from a group comprising pronunciation of individual phonemes, pronunciation of phoneme clusters, pronunciation of homographs, flap sounds and word linkage.

13. The system of claim 8, wherein the one or more-fine grained language-related user skills comprise prominence of words and intonation.

14. The system of claim 8, wherein the one or more-fine grained language-related user skills comprise rhythm, pausing during speech, syllable and phoneme duration.

15. A computer storage medium having instructions stored thereon that, when executed by a data processing apparatus, cause the data processing apparatus to perform operations for creating personalized language lesson recommendations for a user of a language learning application, the operations comprising:
receiving from the user, via a user interface of the language learning application, native language information and self-declared language proficiency level information, wherein the native language information indicates a native language of the user, and wherein the self-declared language proficiency level information indicates a proficiency level of the user for a second language;
assigning a language skill profile to the user based on the received native language information and self-declared language proficiency level information, wherein the language skill profile comprises a skill vector associated with one or more high-level language-related user skills of the user related to at least one of pronunciation skills, word stress skills, intonation skills, fluency and timing skills, and listening ability skills, wherein each high-level language-related user skill comprises one or more fine-grained language-related user skills, and wherein the language learning application matches the user to a plurality of other users who share the native language of the user and the proficiency level of the user for the second language based on the assigned language skill profile of the user;
assigning a difficulty profile to a language learning task to be practiced by the user, wherein the difficulty profile is based on results of one or more of the plurality of other users practicing the language learning task, and wherein the language learning task comprises one or more language learning exercises related to the second language; and
prioritizing the language learning task within a list of recommended language learning tasks offered to the user based on a comparison between the language skill profile of the user and the difficulty profile of the language learning task.

16. The computer storage medium of claim 15, wherein the skill vector indicates a respective skill level of the user for each of the one or more high-level language-related user skills, and wherein the difficulty profile comprises a task difficulty vector indicating a respective difficulty level of the language learning task for each of the one or more high-level language-related user skills.

17. The computer storage medium of claim 15, wherein the language skill profile further comprises an overall skill level for the user and the difficulty profile further comprises an overall difficulty level for the task.

18. The computer storage medium of claim 15, wherein the one or more-fine grained language-related user skills are selected from a group comprising pronunciation of individual phonemes, pronunciation of phoneme clusters, pronunciation of homographs, flap sounds and word linkage.

19. The computer storage medium of claim 15, wherein the one or more-fine grained language-related user skills comprise prominence of words and intonation.

20. The computer storage medium of claim 15, wherein the one or more-fine grained language-related user skills comprise rhythm, pausing during speech, syllable and phoneme duration.

21. The method of claim 1, wherein assigning the language skill profile to the user comprises:
- receiving audio data encoding one or more utterances in the new language spoken by the user while practicing at least one language learning task;
- analyzing, by the language learning application, the audio data; and
- scoring the user based on analysis performed by the language learning application.

* * * * *